US010283851B2

(12) United States Patent
Church et al.

(10) Patent No.: US 10,283,851 B2
(45) Date of Patent: May 7, 2019

(54) BROADBAND CIRCULARLY POLARIZED ANTENNA INCORPORATING NON-FOSTER ACTIVE LOADING

(71) Applicant: SPAWAR Systems Center Pacific, San Diego, CA (US)

(72) Inventors: Justin A. Church, San Diego, CA (US); Nazia Ahmed Mozaffar, San Diego, CA (US); Frederick J. Verd, Santee, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/709,182

(22) Filed: Sep. 19, 2017

(65) Prior Publication Data

US 2019/0089040 A1 Mar. 21, 2019

(51) Int. Cl.
| H01Q 1/32 | (2006.01) |
|---|---|
| H01Q 1/28 | (2006.01) |
| H01Q 1/50 | (2006.01) |
| H02S 30/20 | (2014.01) |
| H02S 10/40 | (2014.01) |
| H01Q 15/24 | (2006.01) |

(52) U.S. Cl.
CPC .............. *H01Q 1/288* (2013.01); *H01Q 1/50* (2013.01); *H01Q 15/24* (2013.01); *H02S 10/40* (2014.12); *H02S 30/20* (2014.12)

(58) Field of Classification Search
CPC ......... H03M 7/00; H01Q 7/005; H01Q 19/00; H01Q 21/26; H01Q 1/288; H01Q 15/24; H01Q 1/50; H02S 10/40; H02S 30/20
USPC ........ 343/726, 728, 741, 744, 797, 833, 834
See application file for complete search history.

(56) References Cited

U.S. PATENT DOCUMENTS

| 3,605,104 A * | 9/1971 | Weston | H01Q 19/06 |
| | | | 343/741 |
| 7,187,336 B2 * | 3/2007 | Parsche | H01Q 7/00 |
| | | | 343/728 |
| 7,692,601 B2 * | 4/2010 | Bisiules | H01P 5/103 |
| | | | 343/797 |
| 7,969,373 B2 * | 6/2011 | Tsilioukas | H01Q 1/243 |
| | | | 343/741 |

(Continued)

*Primary Examiner* — Jean B Jeanglaude
(74) *Attorney, Agent, or Firm* — SPAWAR Systems Center Pacific; Kyle Eppele; J. Eric Anderson

(57) ABSTRACT

An antenna comprising: a solar collector; two conductive, orthogonal half-loops mounted to the solar collector such that the solar collector functions as a ground; an RF power source configured to feed RF power to each of the two half-loops having a 90-degree phase difference relative to each other; and a conductive cage structure surrounding the two half-loops, wherein the cage structure includes a conductive ring disposed above the center section, the conductive ring having an equilateral cross of conductive material disposed within the ring and supported by leg structures which are in electrically-conductive contact with the solar collector, and wherein each leg structure has attached thereto a non-Foster circuit having a negative impedance, wherein the non-Foster circuits are configured to actively load the cage structure such that the cage structure functions as an active, internal matching network for the antenna.

17 Claims, 12 Drawing Sheets

(56) References Cited

U.S. PATENT DOCUMENTS

| | | | |
|---|---|---|---|
| 8,723,731 B2* | 5/2014 | Tatarnikov | H01Q 1/241 343/700 MS |
| 8,952,858 B2* | 2/2015 | de Rochemont | H01Q 9/26 343/803 |
| 9,112,258 B1* | 8/2015 | Church | H01Q 7/005 |
| 9,172,147 B1* | 10/2015 | Manry, Jr. | H01Q 1/286 |
| 2015/0318607 A1 | 11/2015 | Chieh et al. | |

* cited by examiner

Stowed Configuration

Deployment: *First step*

50cm dia circular grd.

50cm cross grd.

6U with Expanded Grd.

6U solar panel configuration

BROADBAND CIRCULARLY POLARIZED ANTENNA INCORPORATING NON-FOSTER ACTIVE LOADING

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 105183.

BACKGROUND OF THE INVENTION

This invention relates to the field of compact antennas. Available real estate for antennas in some areas is very limited. Reducing the physical size of an antenna often leads to a sacrifice in performance. For example, with satellite communications, the size and shape of the satellite's antenna are subject to strict design requirements driven, in part, by the satellite's operating frequency, size, and orbit-delivery-method. As a further example, it is particularly challenging to find a suitable antenna for an ultra-high frequency (UHF) nanosatellite given the small size of the nanosatellite platform and the free space wavelength of UHF signals. There is a need for an improved compact antenna.

SUMMARY

Disclosed herein is an antenna comprising a solar collector; first and second half-loops, a radio frequency (RF) power source, a conductive cage structure, and a non-Foster circuit. The first and second half-loops are mounted to a center section of the solar collector and are electrically conductive, orthogonal to each other, and orthogonal to the center section such that the solar collector functions as a ground. The RF power source is configured to feed RF power to each of the first and second half-loops having a 90-degree phase difference relative to each other such that the first and second half-loops create orthogonal electric fields relative to each other resulting in a circularly polarized total electric field. The cage structure surrounds the first and second half-loops to allow electric current to circulate around the perimeter of the cage structure. The cage structure includes a conductive ring disposed above the center section that has an equilateral cross of conductive material disposed within the ring. The ring is supported by leg structures which are in electrically-conductive contact with the solar collector. Attached to each leg structure is a non-Foster circuit that has a negative impedance. The non-Foster circuits are configured to actively load the cage structure such that the cage structure functions as an active, internal matching network for the antenna.

Also described herein is a method for providing an antenna comprising the following steps. The first step includes providing a folded solar collector having a center section. The next step provides for mounting electrically-conductive first and second half-loops to the center section such that they are orthogonal to each other, and orthogonal to the center section such that the solar collector functions as a ground. The next step provides for configuring an RF power source to feed RF power to each of the first and second half-loops having a 90-degree phase difference relative to each other such that the first and second half-loops create orthogonal electric fields relative to each other resulting in a circularly polarized total electric field. The next step provides for surrounding the first and second half-loops with a conductive cage structure to allow electric current to circulate around the perimeter of the cage structure. The cage structure includes a conductive ring disposed above the center section that has an equilateral cross of conductive material disposed within the ring. The ring is supported by leg structures which are in electrical conduction with conductive surfaces on the solar collector. The next step provides for actively loading the cage structure with non-Foster circuits that are attached to the leg structures. The non-Foster circuits have a negative impedance such that the cage structure functions as an active, internal matching network for the antenna.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed antenna and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
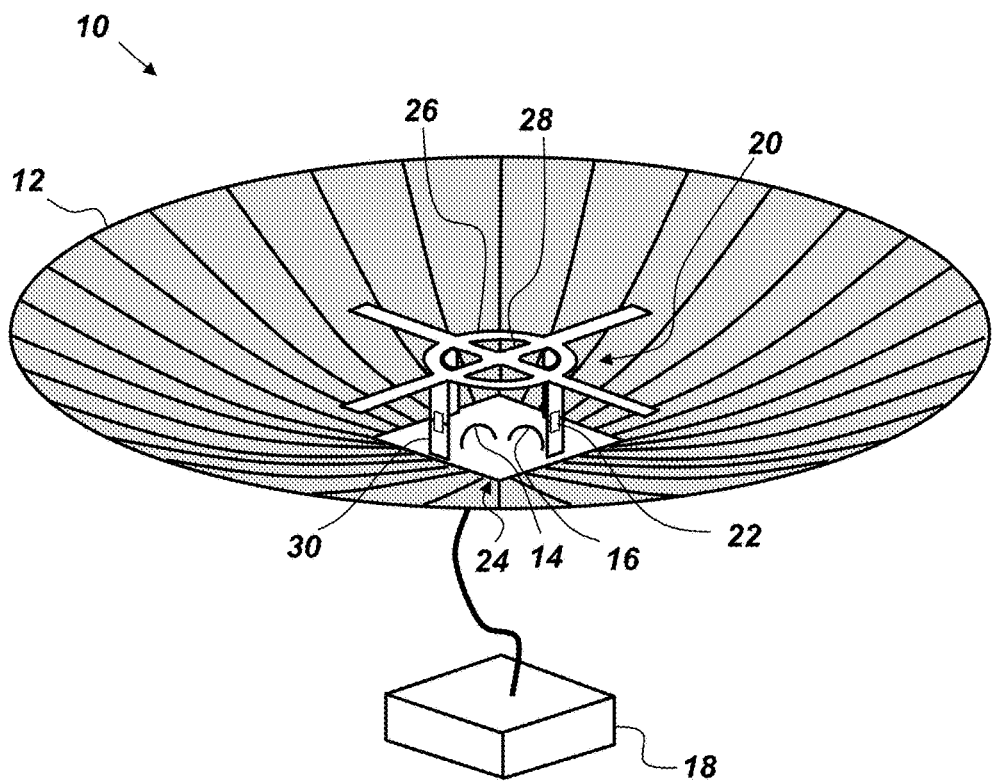
FIG. 1 is a perspective view of an antenna.

FIG. 1 is a perspective view of an antenna 10 that comprises, consists of, or consists essentially of a solar collector 12, a first half-loop 14, a second half-loop 16, an RF power source 18, a conductive cage structure 20, and non-Foster circuits 22. The first and second half-loops 14 and 16 are mounted to a center section 24 of the solar collector 12. The first and second half-loops 14 and 16 are electrically conductive, orthogonal to each other, and orthogonal to the center section 24 such that the solar collector 12 functions as a ground as well as a solar energy collector. The RF power source 18 is configured to feed RF power to each of the first and second half-loops 14 and 16 having a 90-degree phase difference relative to each other such that the first and second half-loops 14 and 16 create orthogonal electric fields relative to each other resulting in a circularly polarized total electric field. The cage structure 20 surrounds the first and second half-loops 14 and 16 to allow electric current to circulate around the perimeter of the cage structure 20. The cage structure 20 includes a conductive ring 26 disposed above the center section 24. The ring 26 has an equilateral cross 28 of conductive material disposed within the ring 26. The ring 26 is supported by four leg structures 30 which are in electrically-conductive contact with the solar collector 12. The non-Foster circuits 22 are attached to the leg structures 30 and have negative impedance. The non-Foster circuits 22 are configured to actively load the cage structure 20 such that the cage structure 20 functions as an active, internal matching network for the antenna 10.

The solar collector 12 may be made of any solar cell technology, that comprises a conductive surface. The conductive surface may serve as a ground for the solar cells. The leg structures 30 are mounted to the solar collector 12 such that the leg structures 30 are in electrically-conductive contact with the conductive surface of the solar collector 12. The solar collector 12, along with the leg structures 30, act as an effective ground plane to reflect radiated energy from the zenith of antenna 10. The solar collector is designed to convert solar radiation into electricity.

The first and second half-loops 14 and 16 may each be any conductive element capable of being driven by incoming electromagnetic radiation such as in a receiving antenna. Each of the first and second half-loops 14 and 16 may be made of any conductive material and have any desired size and shape. A suitable example embodiment of each of the first and second half-loops 14 and 16 is, but is not limited to, a circular half loop made of copper where a first side of the half-loop 14 or 16 is electrically connected to the solar collector 12 and a second side passes through the solar collector 12 and is connected to the RF power source 18. Being thus connected, the combination of first and second half-loops 14 and 16 and the solar collector 12 acting as the ground induce the "image" of the other half of each half-loop and hence, the combination acts electrically as two whole loops.

The RF power source 18 may be any receiver, transmitter, or transceiver. For example, the antenna 10 may be designed to provide for wireless communications over the UHF channel of 300-380 MHz, which is useful for nanosatellite communication links. The antenna 10 may be mounted to a satellite's solar collector. The antenna 10 may be scaled for use at different frequencies of operation. In addition, several ground plane configurations could be devised.

The non-Foster circuits 22 may be any circuit with a non-Foster impedance such that there is a negative inductance (−L), a negative capacitance (−C), or both. This non-Foster impedance is configured to impedance match the antenna 10. The non-Foster circuit 22 may have a parallel combination of a negative capacitance (−C) and a negative inductance (−L). The most optimal combination will vary with changes in the antenna structure.

Figure 2:
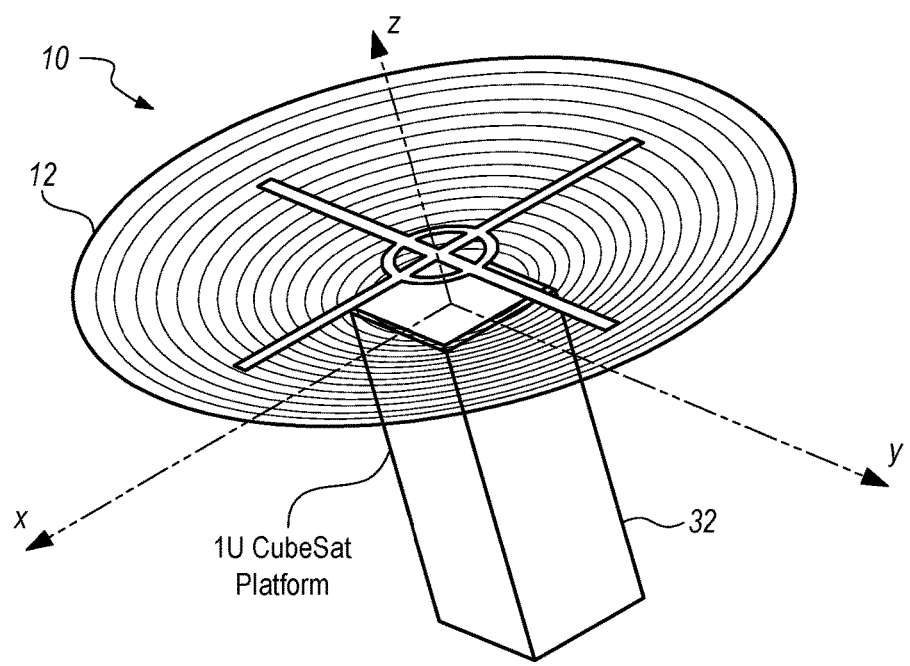
FIG. 2 is a perspective view of an antenna mounted to a nanosatellite.

FIG. 2 is an illustration of the antenna 10 mounted to a 1 U nanosatellite 32. The size constraint of the 1 U nanosatellite platform (10×10×10 cm) is particularly challenging for UHF communications given the operational wavelength: ≥1 m. The nanosatellite-mounted embodiment of antenna 10 achieves a gain and bandwidth that exceeds that of the prior art UHF nanosatellite antennas of comparable size. The simulated radiation efficiency is >85%. In addition, the non-Foster circuitry 22 provides a means to impedance match the antenna 10 over a broad frequency band 240-380 MHz, i.e., 130 MHz of bandwidth. This bandwidth performance far exceeds passive matching methods (see FIG. 4).

As mentioned above, the cage structure 20 induces two orthogonal electric fields which are 90 degrees out of phase, which produces omni-directional circularly polarized radiation patterns. The cage structure 20 is loaded with active transistorized non-Foster circuitry (i.e., the non-Foster circuits 22) that creates a negative reactance profile which provides for a broadband instantaneous bandwidth performance. This bandwidth exceeds that which would be possible if conventional passive circuitry were used with an antenna having the same physical size as the nanosatellite embodiment of antenna 10.

Figure 3A:
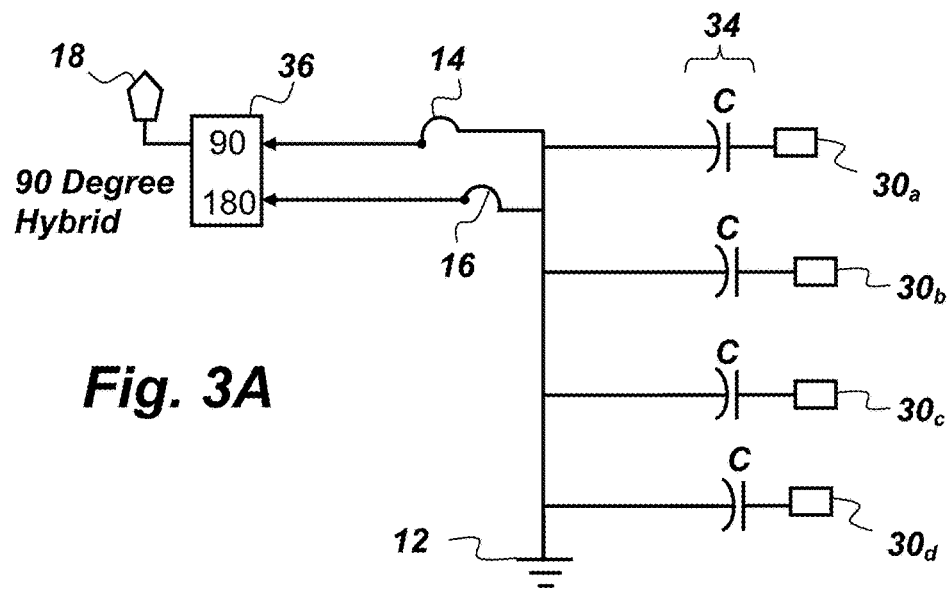
FIGS. 3A and 3B are circuit diagrams.
Figure 3B:
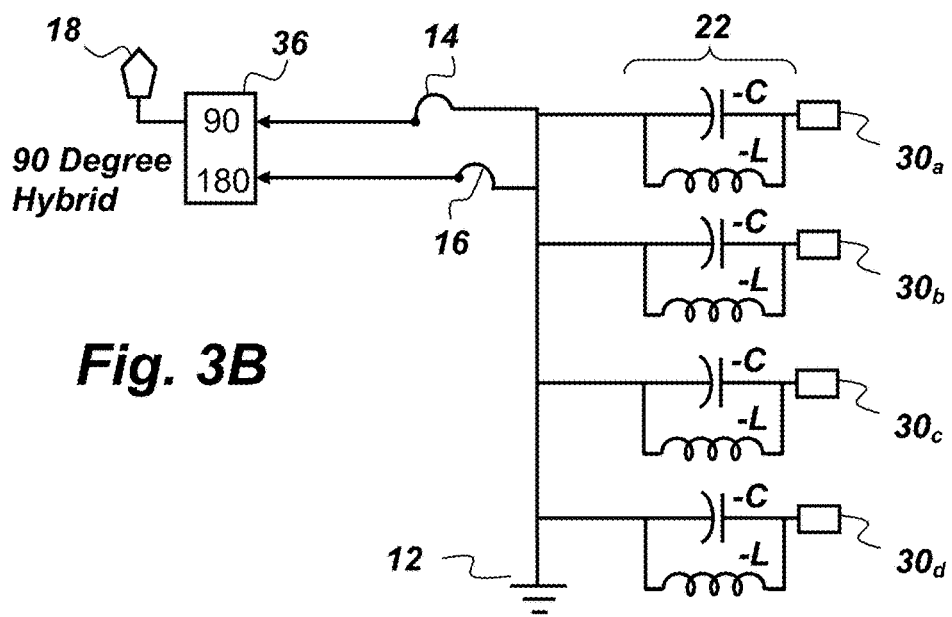

FIG. 3A is a circuit diagram of a passive matching circuits 34 that could be used with an antenna having the same physical size as the nanosatellite embodiment of antenna 10. In this embodiment, each of the passive circuits 34 is attached to a corresponding leg structure $30_a$, $30_b$, $30_c$, or $30_d$. The first and second half-loops 14 and 16 are connected to different ports of the ninety-degree hybrid 36. FIG. 3B is a circuit diagram of example, active, non-Foster matching circuits 22.

Figure 4:
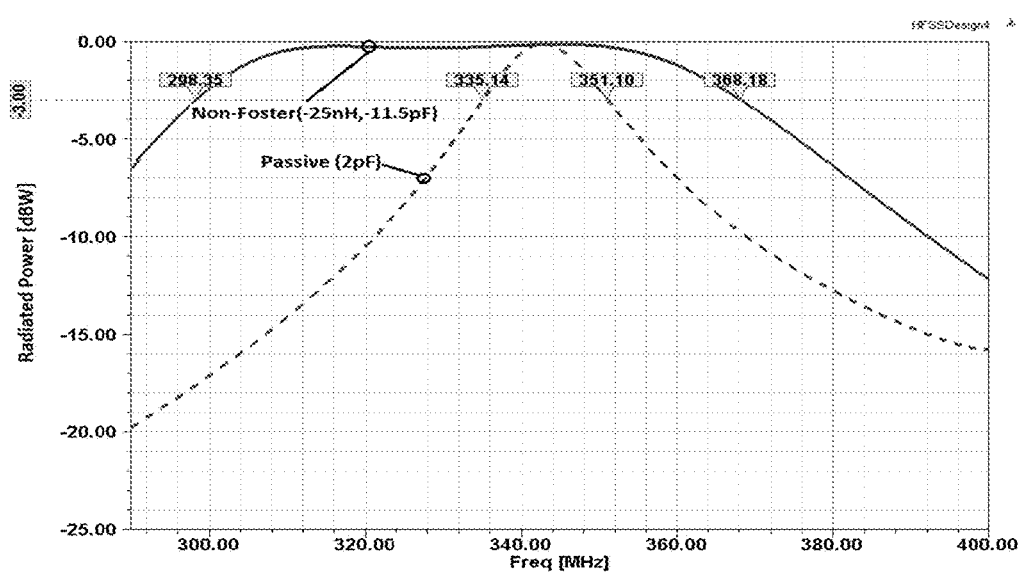
FIG. 4 is a plot of simulated radiated power performance of two different antenna embodiments.

FIG. 4 is a plot of simulated radiated power performance [dBW] of (1) an antenna having the same physical size as the nanosatellite embodiment of antenna 10 but that is passively matched with the circuit topology depicted in FIG. 3A and (2) the nanosatellite embodiment of antenna 10 having non-Foster circuits 22 as depicted in FIG. 3B. The plot of FIG. 4 compares the performance of passive matching versus non-Foster matching. The solid trace in FIG. 4 represents the simulated dBW of the antenna 10 being actively, matched with the non-Foster circuits 22. The dotted trace in FIG. 4 represents the simulated dBW of a passively matched antenna. In this simulation, the capacitor of each non-Foster circuit 22 had a value of −11.5 pF and the inductor of each non-Foster circuit 22 had a value of −25 nH. For the passive-matching embodiment, the capacitor of each passive circuit 34 had a value of 2 pF. As can be seen, the non-Foster circuits 22 offer better performance over a greater bandwidth than the passive circuits 34.

Figure 5A:
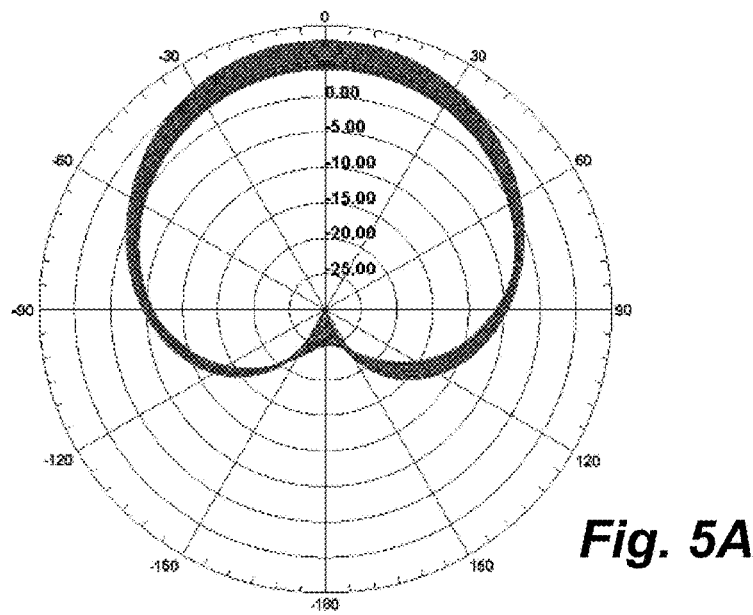
FIG. 5A is a plot of computer-simulated, right-hand-circularly-polarized radiation patterns of an antenna embodiment.
Figure 5B:
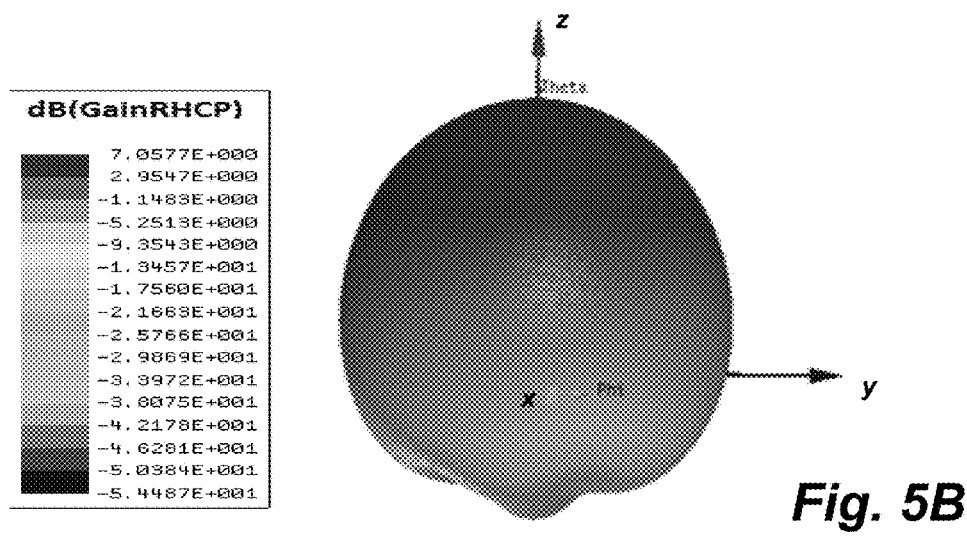
FIG. 5B is a three-dimensional plot of the right-hand-circularly-polarized gain pattern of an antenna embodiment.

FIG. 5A is a plot of computer-simulated, right-hand-circularly-polarized (RHCP) radiation patterns of the nanosatellite embodiment of the antenna 10 over the frequency range of 250-380 MHz. In FIG. 5, a separate curve was plotted for each frequency between 250 and 380 MHz at 1 MHz intervals. FIG. 5B is a three-dimensional plot of the RHCP gain pattern at 340 MHz for the nanosatellite embodiment of the antenna 10. Both FIGS. 5A and 5B are on a dB (isotropic circular) scale. The antenna 10 may be either RHCP or left-hand-circularly-polarized (LHCP).

Figure 6A:
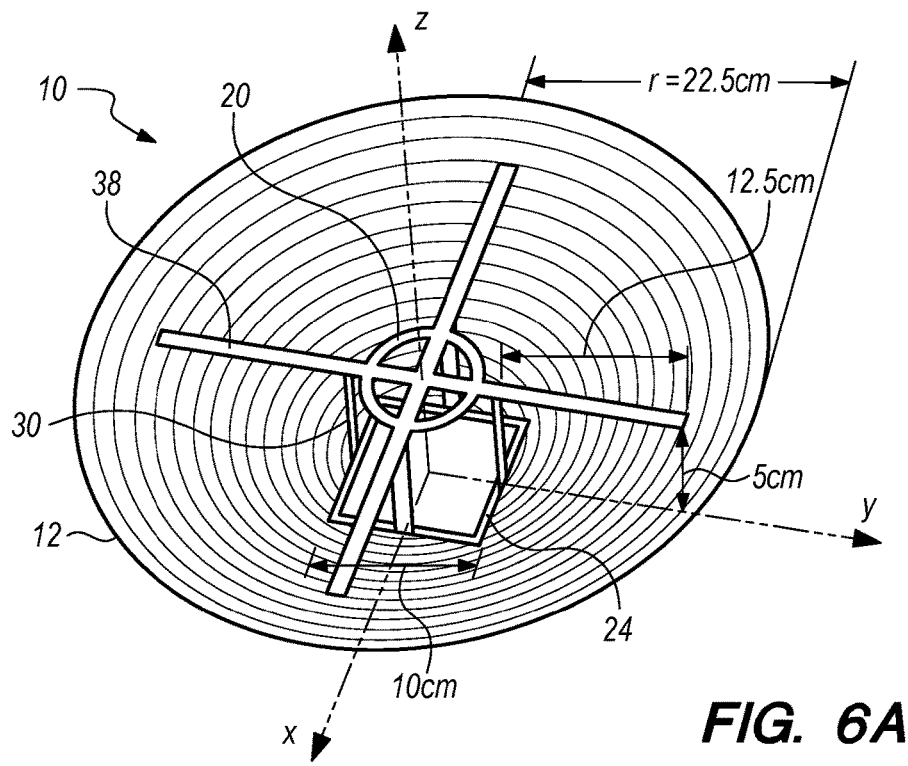
FIG. 6A is a perspective view of an embodiment of an antenna.
Figure 6B:
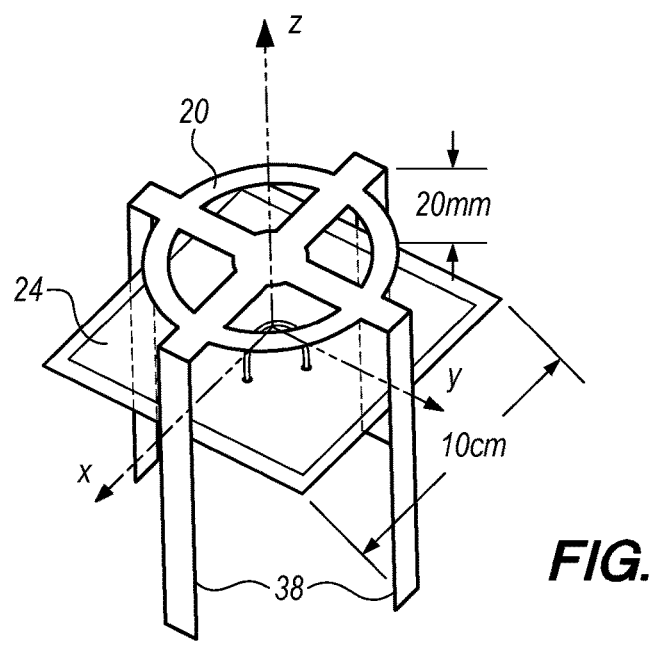
FIG. 6B is a perspective view of an embodiment of an antenna with folded conductive arms.

FIG. 6A is a perspective view of a prototype embodiment of the antenna 10 showing dimensions. This embodiment of the antenna 10 further comprises conductive arms 38 that are hingedly attached to an outer edge of the conductive ring 26. In this embodiment, each conductive arm 38 is 12.5 centimeters, the center section 24 of the solar collector 12 is a square having a width of 10 centimeters, the solar collector 12 has a radius of 22.5 centimeters, and the leg structures are 5 centimeters tall. FIG. 6B is a perspective view of an embodiment of the antenna 10 showing how the conductive arms 38 may be folded with respect to the cage structure 20. In the embodiment of the antenna 10 shown in FIG. 5B, the leg structures 30 are 20 millimeters tall.

Figure 7:
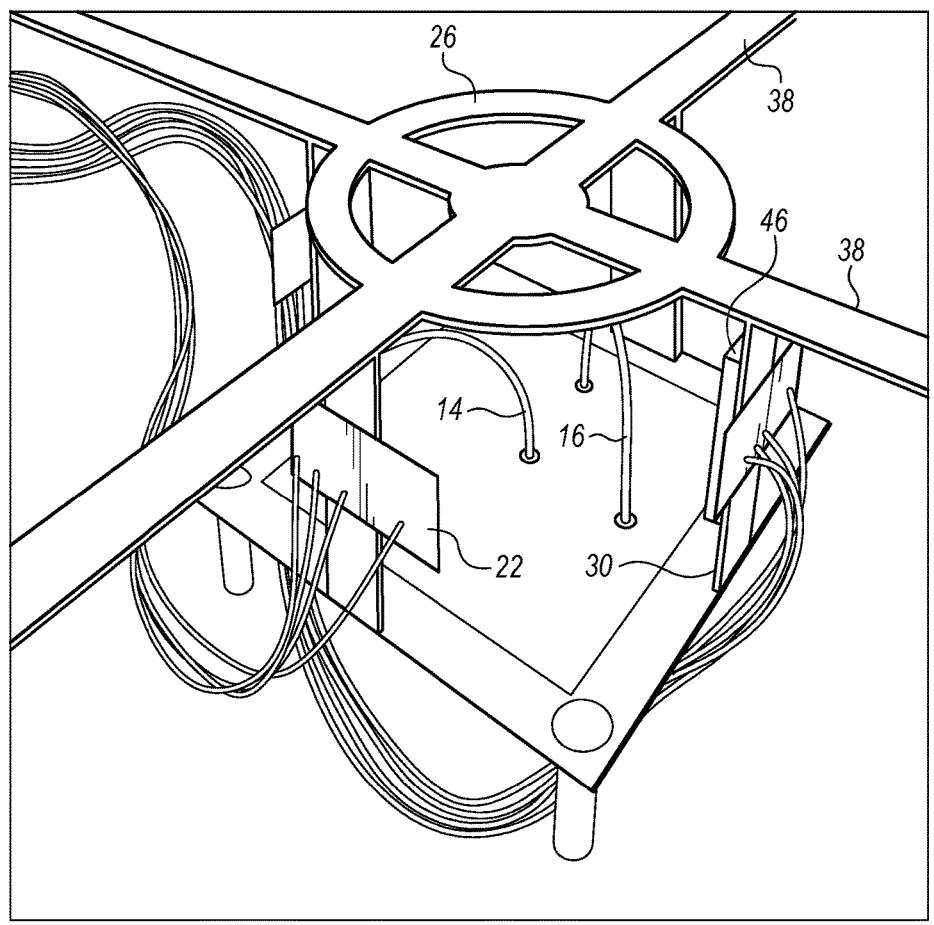
FIG. 7 is a photograph of a prototype embodiment of an antenna.

FIG. 7 is a photographic representation of another embodiment of the antenna 10 (the solar collector 12 is not shown in FIG. 7). In this embodiment, which was also a prototype embodiment, the conductive arms 38 are not shown as hingedly attached to the ring 26. In FIG. 7, the non-Foster circuits 22 can be seen attached to the leg structures 30.

Figure 8:
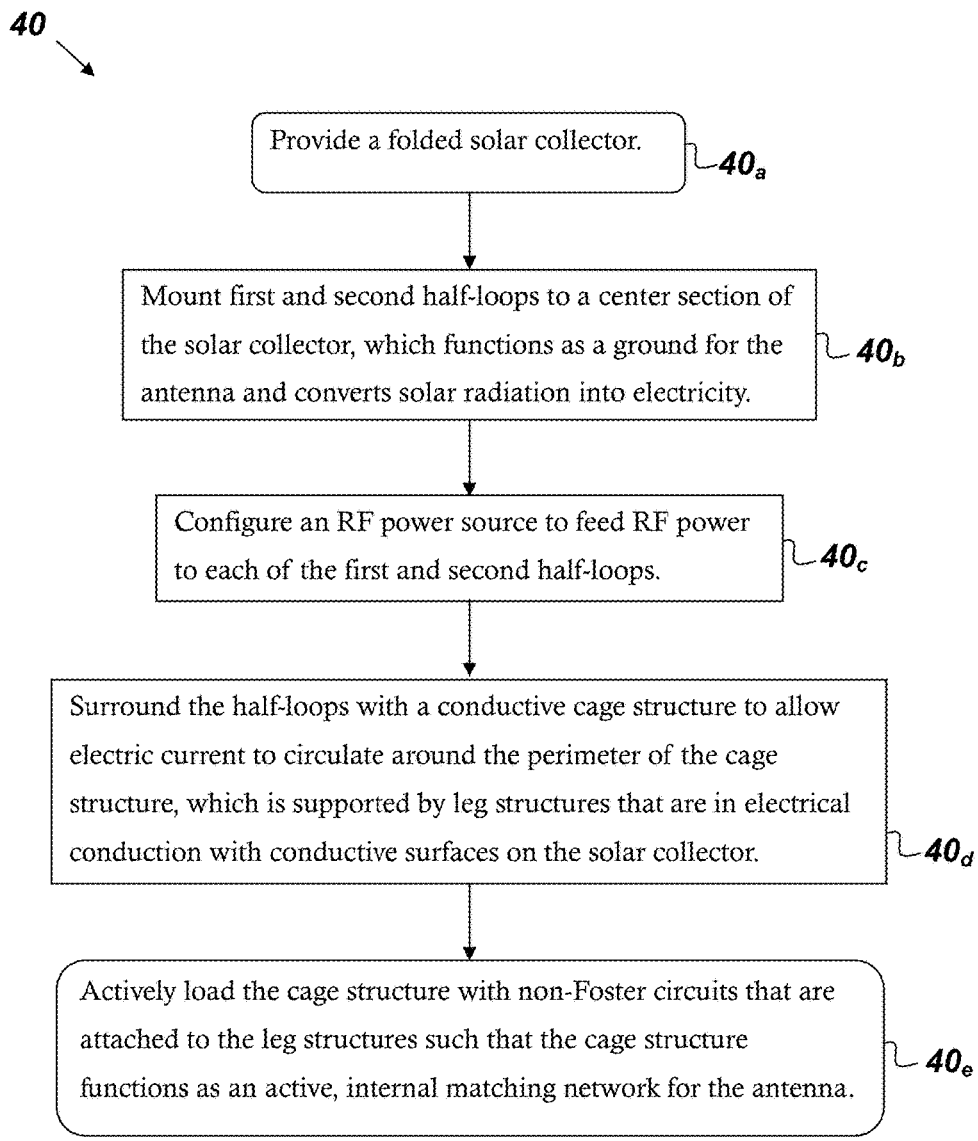
FIG. 8 is a flowchart of a method for providing an antenna.

FIG. 8 is a flowchart of a method 40 for providing the antenna 10. The first step $40_a$ involves providing a folded solar collector. The next step $40_b$ provides for mounting first and second half-loops to a center section of the solar collector, which functions as a ground for the antenna and converts solar radiation into electricity. The next step $40_c$ provides for configuring an RF power source to feed RF power to each of the first and second half-loops. The next step $40_d$ provides for surrounding the first and second half-loops with a conductive cage structure to allow electric current to circulate around the perimeter of the cage structure that is supported by leg structures which are in electrical conduction with conductive surfaces on the solar collector. The next step $40_e$ provides for actively loading the cage structure with non-Foster circuits that are attached to the leg structures such that the cage structure functions as an active, internal matching network for the antenna.

Figure 9A:
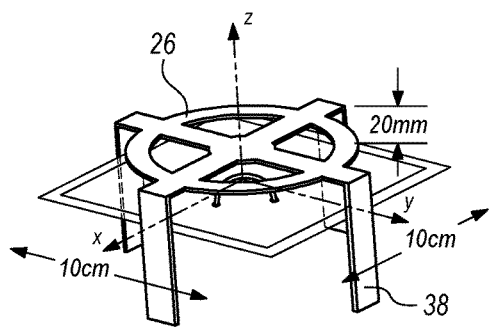
FIGS. 9A, 9B, and 9C are perspective views of an embodiment of an antenna showing different stages of deployment.
Figure 9B:
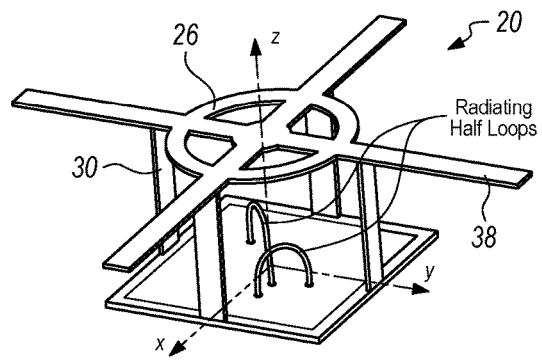
Figure 9C:
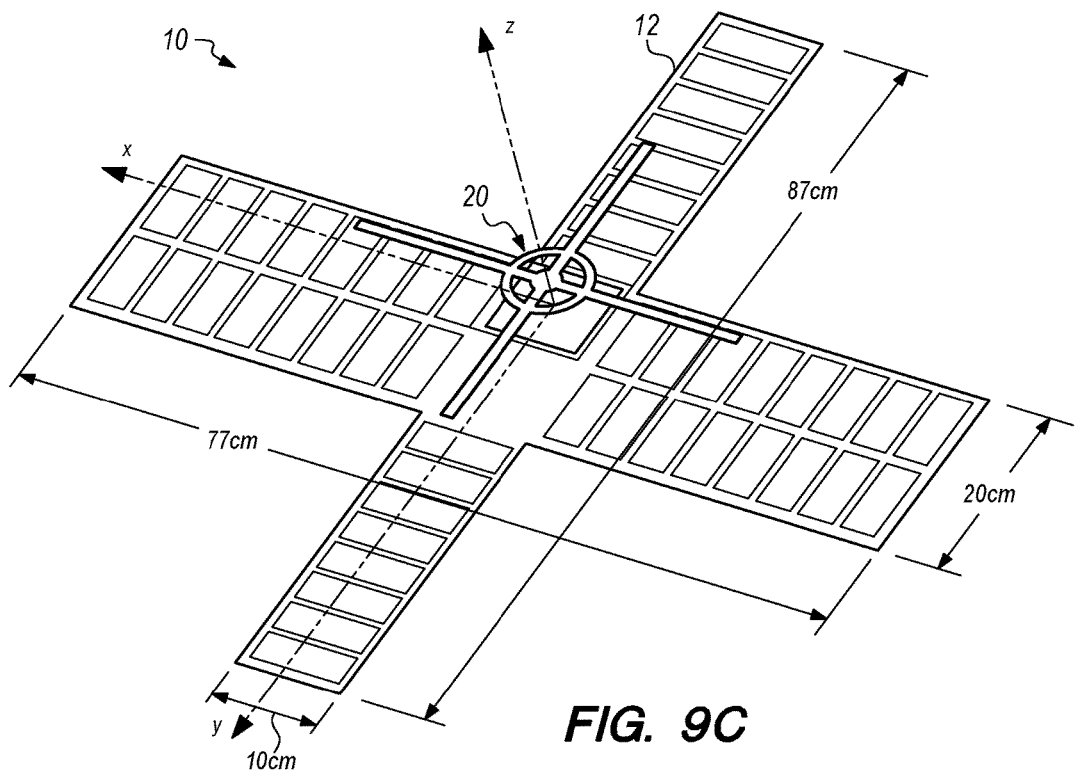

FIGS. 9A, 9B, and 9C are illustrations of the nanosatellite embodiment of the antenna 10 in three different deployment stages. FIG. 9A depicts the nanosatellite embodiment of the antenna 10 in a stowed configuration. FIG. 9B shows the conductive arms 38 in a deployed position where the conductive arms 38 are substantially parallel with the conductive ring 26. Any suitable means as is known in the art may be used to unfold the conductive arms 38 from the stowed position to the deployed position. FIG. 9C shows a fully deployed configuration of the nanosatellite embodiment of the antenna 10 from a 1 U nanosatellite footprint (10×10 cm).

Figure 10A:
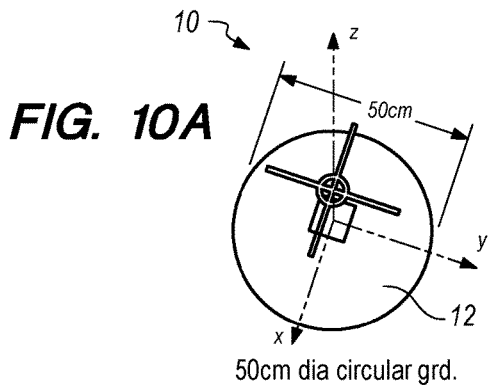
FIGS. 10A, 10B, 10C, and 10D are perspective views of different embodiments of an antenna.
Figure 10B:
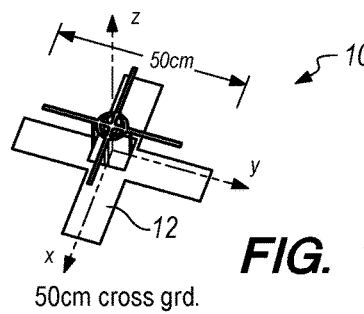
Figure 10C:
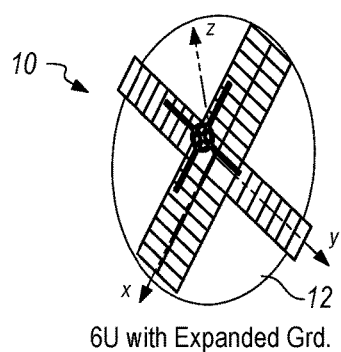
Figure 10D:
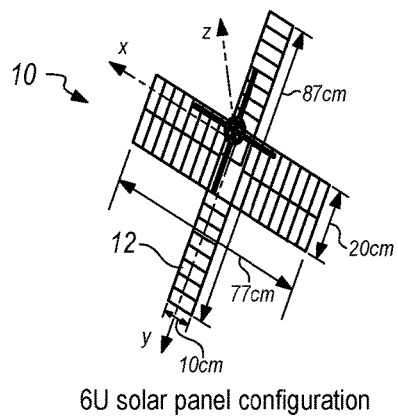
Figure 10E:
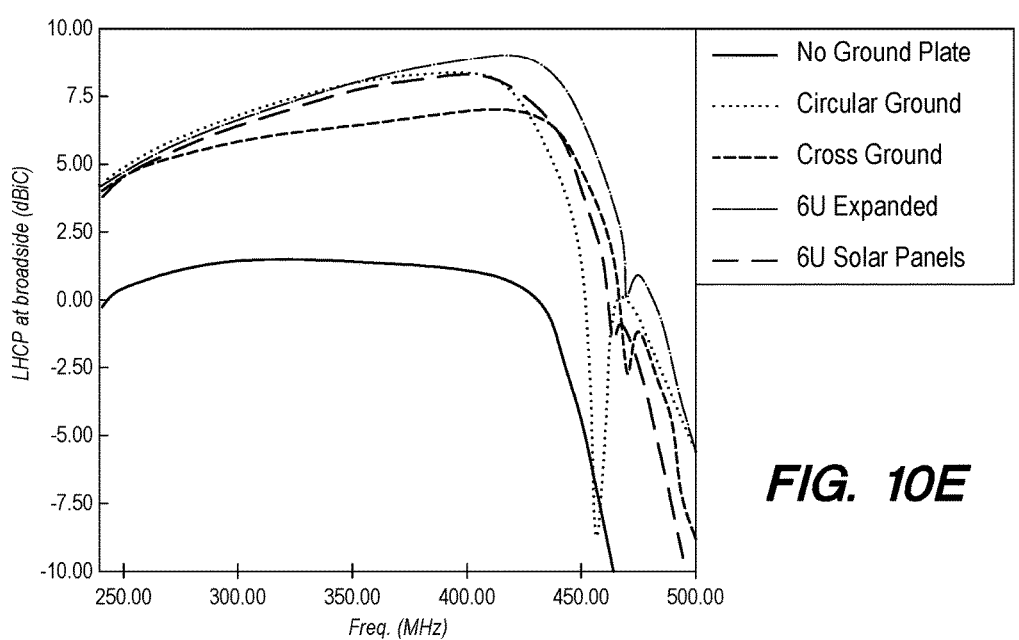
FIG. 10E is a plot comparing the left-hand-circularly-polarized performance of various embodiments of an antenna.

FIGS. 10A, 10B, 10C, and 10D are illustrations of different embodiments of antenna 10, each embodiment having a different solar collector 12 configuration. In FIG. 10A, the solar collector 12 has a circular shape with a 50 centimeter diameter. In FIG. 10B, the solar collector 12 has a cross shape wherein the total height and the total width of the cross are both 50 centimeters. In FIG. 10C, the solar collector 12 is a roughly cross-shaped solar array such as are used with 6 U nanosatellites with extensions added between arms of the cross to give the solar collector 12, in this embodiment, an overall circular shape. In FIG. 10D, the solar collector 12 is a roughly cross-shaped solar panel configuration such as are used with 6 U nanosatellites without any extensions. FIG. 10E is a plot comparing the LHCP performance of the various embodiments of antenna 10 depicted in FIGS. 10A, 10B, 10C, and 10D as well as the performance of an antenna having the same characteristics of antenna 10 but without the solar collector 12 (i.e., without a ground).

Figure 11:
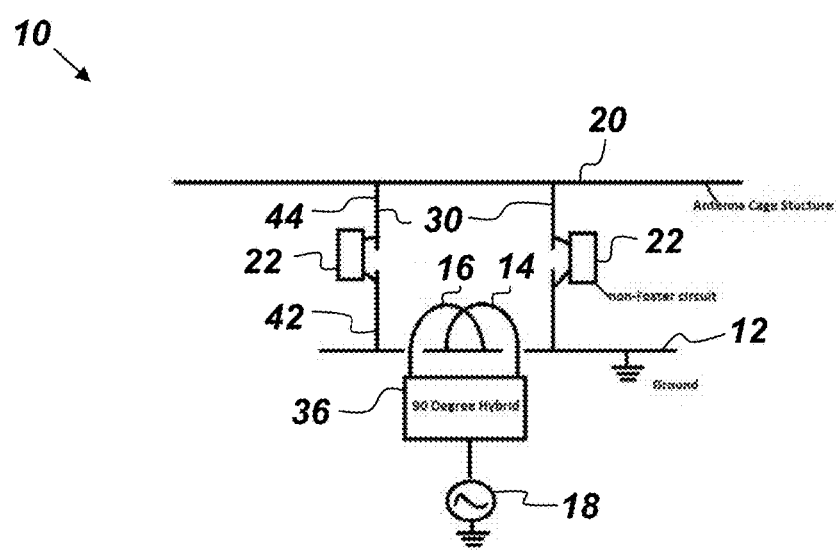
FIG. 11 is a side-view representation of an antenna.

FIG. 11 is a side-view representation of an embodiment of the antenna 10. FIG. 11 shows how in this embodiment, the leg structure 30 is split into a lower section 42 and an upper section 44, which are electrically isolated from each other except for the non-Foster circuit 22 which is connected to both the lower and upper sections 42 and 44. The leg structure 30 may be optionally reinforced with non-conductive material 46 (shown in FIG. 7) at the location of the split between the upper and lower sections 44 and 42. Also shown in this embodiment, one end of each of the first and second half-loops 14 and 16 pass through respective holes in the solar collector 12 to connect to the 90° hybrid 36. The other ends of the first and second half-loops 14 and 16 are connected to the solar collector 12 as a ground.

Figure 12:
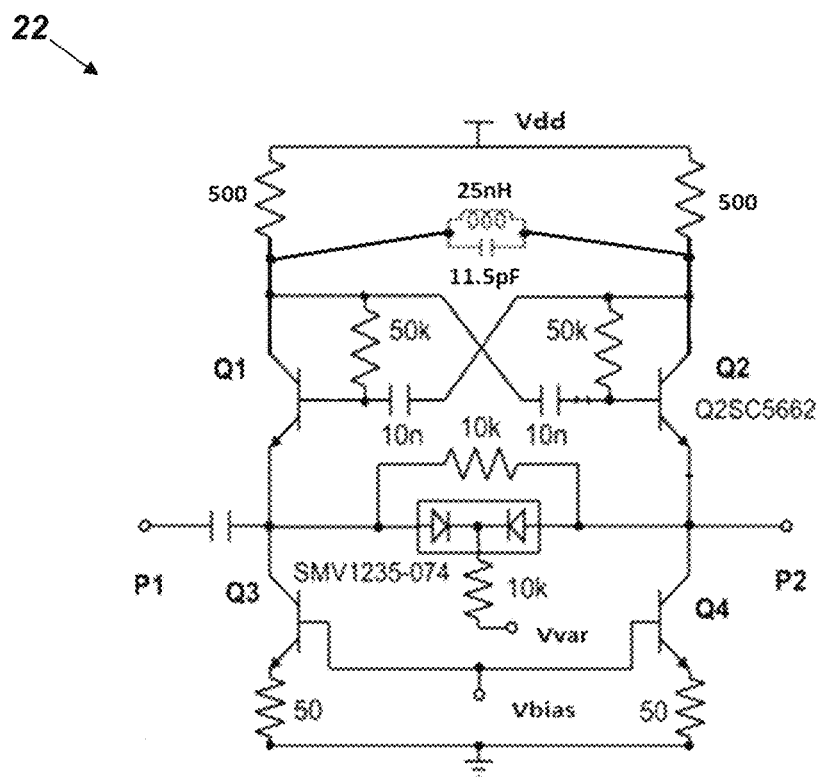
FIG. 12 is a circuit diagram of an embodiment of a non-Foster circuit.

FIG. 12 is a detailed circuit diagram of an example embodiment of the non-Foster circuit 22. In this embodiment of the non-Foster circuit 22, the non-Foster impedance was optimized to the specific values of (−C=−11.5 pF) and (−L=−25 nH) in parallel. This embodiment of the non-Foster circuit 22 was designed to maximize the radiated power bandwidth for the prototype embodiment of antenna 10 shown in FIG. 7. In the embodiment of the non-Foster circuit 22 shown in FIG. 12, the supply voltage $V_{dd}$ may be from 20 to 25 volts, the bias voltage $V_{bias}$ acts as a current mirror and may be between 0.5 to 1 volts. This embodiment also includes a variable voltage input $V_{var}$, which may be tuned from 5 to 25 volts, which in turn tunes the capacitance of the non-Foster circuit 22. In FIG. 12, the two ports $P_1$ and $P_2$ are connected to separate, electrically-isolated sections (such as the lower and upper sections 42 and 44) of the leg structure 30 to which the non-Foster circuit 22 is attached. Each of the ports $P_1$ and $P_2$ may be connected to one or the other of the lower section 42 and the upper section 44.

From the above description of the antenna 10, it is manifest that various techniques may be used for implementing the concepts of the antenna without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the antenna 10 is not limited to the particular embodiments described herein, but is capable of many embodiments without departing from the scope of the claims.

We claim:
1. An antenna comprising:
a solar collector;
first and second half-loops mounted to a center section of the solar collector, wherein the first and second half-loops are electrically conductive, orthogonal to each other, and orthogonal to the center section such that the solar collector functions as a ground;
a radio frequency (RF) power source configured to feed RF power to each of the first and second half-loops having a 90-degree phase difference relative to each other such that the first and second half-loops create orthogonal electric fields relative to each other resulting in a circularly polarized total electric field; and
a conductive cage structure surrounding the first and second half-loops to allow electric current to circulate around the perimeter of the cage structure, wherein the cage structure includes a conductive ring disposed above the center section, the conductive ring having an equilateral cross of conductive material disposed within the ring and supported by leg structures which are in electrically-conductive contact with the solar collector, and wherein each leg structure has attached thereto a non-Foster circuit having a negative impedance, wherein the non-Foster circuits are configured to actively load the cage structure such that the cage structure functions as an active, internal matching network for the antenna.

2. The antenna of claim 1, wherein the solar collector is mounted on a satellite.

3. The antenna of claim 2, wherein the cage structure further comprises conductive arms hingedly attached to an outer edge of the conductive ring.

4. The antenna of claim 3, wherein the conductive arms are positioned on the conductive ring so as to form out-of-ring extensions of the equilateral cross.

5. The antenna of claim 4, wherein the cage structure is made of copper.

6. The antenna of claim 5, wherein the conductive ring is circular.

7. The antenna of claim 6, wherein the solar collector is designed to be foldable.

8. The antenna of claim 2, wherein the satellite is a 1 U nanosatellite having stowed, exterior, total dimensions of 10×10×10 centimeters.

9. The antenna of claim 1, wherein the satellite is a multi-U nanosatellite, and the antenna in foldable such that the folded antenna is configured to fit within the multi-U nanosatellite.

10. The antenna of claim 1 wherein each leg structure has upper and lower sections that are electrically isolated from each other save for the corresponding non-Foster circuit which is electrically connected to both the upper and lower sections.

11. A method for providing an antenna comprising:
providing a folded solar collector having a center section;
mounting first and second half-loops to the center section, wherein the first and second half-loops are electrically conductive, orthogonal to each other, and orthogonal to the center section such that the solar collector functions as a ground;
configuring a radio frequency (RF) power source to feed RF power to each of the first and second half-loops having a 90-degree phase difference relative to each other such that the first and second half-loops create orthogonal electric fields relative to each other resulting in a circularly polarized total electric field;
surrounding the first and second half-loops with a conductive cage structure to allow electric current to circulate around the perimeter of the cage structure, wherein the cage structure includes a conductive ring disposed above the center section, the conductive ring having an equilateral cross of conductive material disposed within the ring and supported by leg structures which are in electrical conduction with conductive surfaces on the solar collector; and
actively loading the cage structure with non-Foster circuits that are attached to the leg structures, wherein the non-Foster circuits have a negative impedance such that the cage structure functions as an active, internal matching network for the antenna.

12. The method of claim 11, further comprising mounting the antenna on a nanosatellite.

13. The method of claim 12, further comprising positioning the nanosatellite in low Earth orbit (LEO).

14. The method of claim 13, further comprising unfolding the solar collector such that the solar collector simultaneously harvests solar energy to power the nanosatellite and serves as the ground for the antenna.

15. The method of claim 14, further comprising deploying conductive arms that are hingedly attached to an outer edge of the conductive ring such that when deployed, the conductive arms form out-of-ring extensions of, and in the same plane as, the equilateral cross.

16. The method of claim 15, further comprising the step of communicating with the antenna over a broad frequency band of 240-380 MHz.

17. The method of claim 16, further comprising the step of splitting each leg structure into upper and lower sections that are electrically isolated from each other except for the non-Foster circuit which is electrically attached to both the upper and lower sections of each corresponding leg structure.

* * * * *